(12) United States Patent
Rufo, Jr. et al.

(10) Patent No.: US 6,283,283 B1
(45) Date of Patent: Sep. 4, 2001

(54) MECHANICALLY ASSEMBLED COMPACT DISC PACKAGE

(75) Inventors: George F. Rufo, Jr., Dalton; David Louis Bolognia, Lanesboro, both of MA (US)

(73) Assignee: Lakewood Industries, Inc., Pittsfield, MA (US)

( * ) Notice: Subject to any disclaimer, the term of this patent is extended or adjusted under 35 U.S.C. 154(b) by 0 days.

(21) Appl. No.: 09/734,178

(22) Filed: Dec. 12, 2000

Related U.S. Application Data

(63) Continuation of application No. 09/457,733, filed on Dec. 10, 1999, now abandoned.

(51) Int. Cl.$^7$ .................................................. B65D 89/97
(52) U.S. Cl. ........................ 206/308.1; 206/310; 206/493
(58) Field of Search .............................. 206/308.1, 310, 206/312, 311, 313, 472, 493, 232

(56) References Cited

U.S. PATENT DOCUMENTS

| | | |
|---|---|---|
| 5,236,081 | 8/1993 | Fitzsimmons et al. . |
| 5,366,074 | 11/1994 | O'Brien et al. . |
| 5,630,504 | 5/1997 | Fitzsimmons et al. . |
| 5,788,069 | 8/1998 | Calhoun, III et al. . |
| 5,816,394 | 10/1998 | O'Brien et al. . |
| 5,884,761 | 3/1999 | Gelardi et al. . |
| 5,894,924 | 4/1999 | Koch . |

*Primary Examiner*—Shian Luong
(74) *Attorney, Agent, or Firm*—Nixon Peabody LLP; Stuart J. Friedman

(57) ABSTRACT

An improved storage package for a recording medium includes a paper board component releasably attached to a plastic, recording medium-holding component. The paper board component includes a flat base panel having upstanding flaps extending substantially perpendicular to the base panel. The plastic component includes a generally planar surface having a skirt depending therefrom. Lugs extend under the planar surface from the skirt for engaging apertures on the flaps. Inclined walls depend from the planar surface adjacent the skirt for guiding and directing the leading edge of each of the flaps.

16 Claims, 8 Drawing Sheets

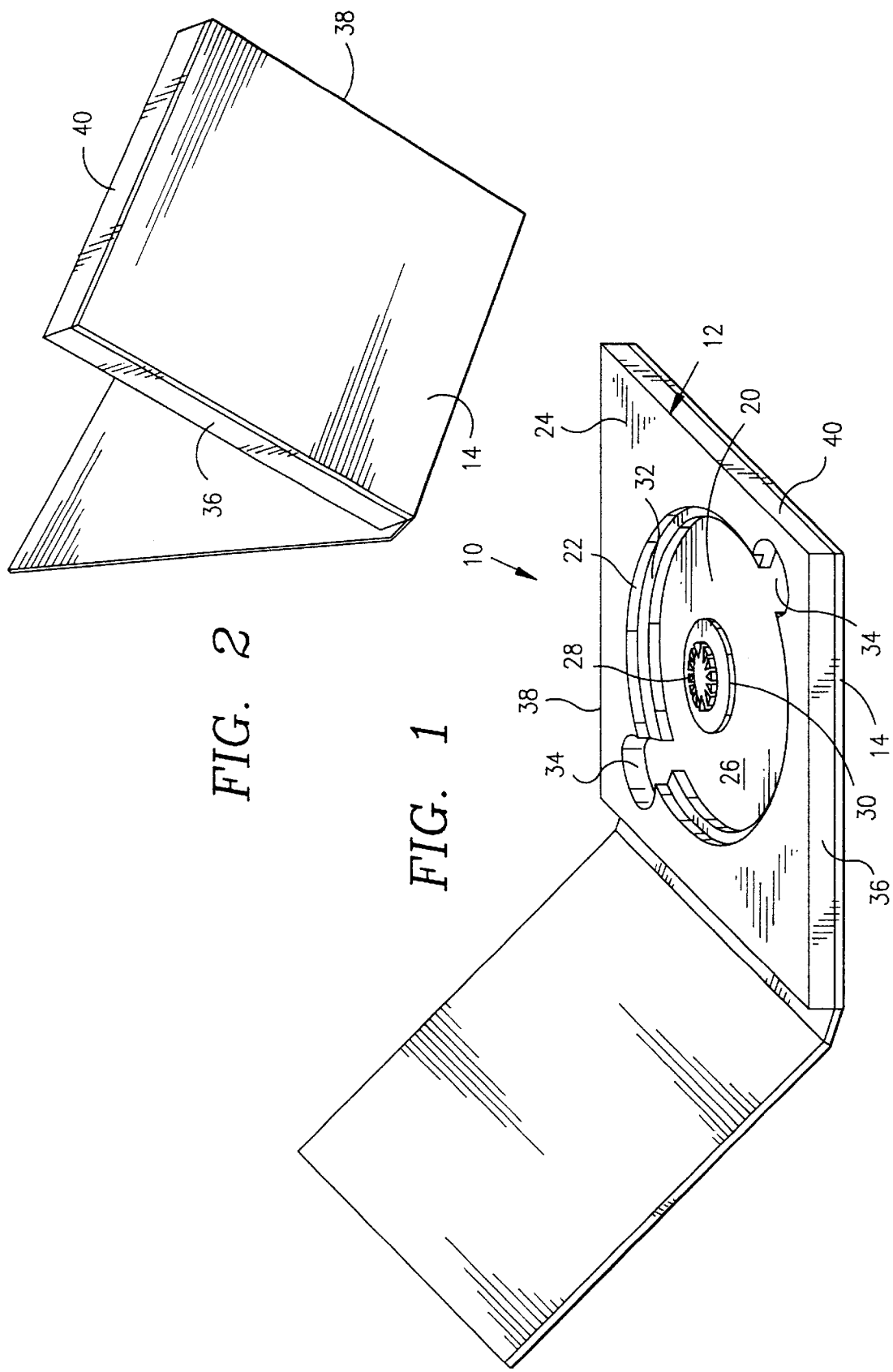

MECHANICALLY ASSEMBLED COMPACT DISC PACKAGE

CROSS-REFERENCE TO RELATED APPLICATIONS

This application is a continuation of pending U.S. application Ser. No. 09/457,733, filed Dec. 10, 1999 now ABN.

BACKGROUND OF THE INVENTION

1. Field of the Invention

The present invention relates generally to a storage package for a recording medium and, more particularly, to such a package comprising a paperboard cover mechanically assembled to a plastic disc holder.

2. Description of the Prior Art

Various types of planar discs are in use at the present time to record and store information which is to be retrieved by various means, such as by optical or magnetic means. Typical of such discs are compact discs in which information is digitally recorded by use of a laser beam and then read optically by a laser beam. Such discs are used to record audio information, such as musical renditions, video information such as visual images and digital information for use as read only and other memories for use in various applications, such as computer applications. In most instances, at the present time, such discs are sold with information already recorded thereon. In other applications, such discs are sold in blank form and are used by the customer to record information thereon. In the latter case, for example, optical discs are sold for use as computer storage media and are used in hard disc storage systems. As used herein, the term compact disc or CD is intended to encompass all such discs, whatever their size, for all known or proposed uses.

Compact discs containing laser recorded information are typically packaged in injection molded plastic enclosures designed to hold one or more CDs for protecting the discs during storage and shipment. Enclosures commonly used at the present time, such as the well known "jewel box", comprise a three piece assembly consisting of a base or bottom element, an insert or tray in the base/bottom element for positioning and supporting the disc in the base/bottom element, e.g., by a center projection (commonly referred to as a "rosette") which engages the periphery of the aperture in the center of the disc, and a lid or cover which is hinged to the base/bottom element and is closed thereon after the disc is mounted therein on the tray. Other enclosures utilize only two pieces, omit the tray, and position and support the disc via the center projection directly on the base/bottom element. The enclosure is, typically, at least partially transparent and graphics relating to the disc and containing trademark and sales promotional information are usually inserted in such a manner as to be visible through the enclosure.

Except for the printed matter inserted therein, the "jewel box" is entirely plastic. For this reason, the use of this type of enclosure is relatively expensive. Moreover, the use of such an enclosure is believed to be ecologically unacceptable by many because the plastic is non-biodegradable and, in view of the huge volume of such enclosures in use today, the disposal of these enclosures poses either a real or potential environmental problem. One solution to both of these problems has been the development of hybrid packages comprising both paper board and plastic components. Many of these hybrid packages assemble the plastic components to the paperboard using an adhesive material. As a result, the components are not readily separable and efforts to separate them frequently lead to damage to the paper and plastic components. Thus, the components are, as a practical matter, neither recyclable nor reusable.

More recently, efforts have been made to overcome this problem by creating a package which permits easier separation between the plastic and paper board components. For example, U.S. Pat. No. 5,366,074—O'Brien et al discloses a storage package for a CD or other recording medium having a plurality of nonplastic panels and a holder formed of plastic disposed on one of the panels for receiving and maintaining the recording medium thereon. The holder is releasably secured to one of the non-plastic panels by means other than glue. One such means for releasably securing includes a pair of lateral extensions on the holder having a series of first mating elements thereon and a series of apertures in the panel, the extensions being pivotable between a non-engaging orientation and an engaging orientation wherein the first mating elements extend through the panel apertures and releasably engage a series of second mating elements on the holder. Another means for releasably securing comprises at least one pin projecting outwardly from the holder body which passes through at least one opening in the panel, after which the protruding free end of the pin is deformed to form an enlarged head to lock the panel on the pins. A still further means for releasably securing includes at least one inwardly turned laterally extending lug on the lateral sides of the holder which are vertically spaced below the holder body, the lateral panel sides frictionally engaging between the lugs and the bottom of the holder body.

U.S. Pat. No. 5,630,504—Fitzsimmons et al discloses a CD package comprising a molded plastic tray and a paper board having a panel thereof attached to the tray, the tray having a base with a centrally mounted rosette for gripping and holding the CD and segmental inner walls extending upward from the base for defining a recess for receiving the CD. Openings are provided in the base for receiving upstanding portions of the paper board therethrough and detents are provided on the segmented walls for engaging portions of the paper board after such portions have been folded over to lie flat on the top of the base.

U.S. Pat. No. 5,236,081—Fitzsimmons et al discloses a CD package comprising a plastic injection molded CD holder and a foldable paperboard cover. The holder includes a plurality of shelves extending from opposite lateral sides underneath, parallel to and spaced vertically from the base of the holder for slidably receiving the lateral edges of the cover to permit the cover to be mounted on and slidable along the holder between first and second positions.

U.S. Pat. No. 5,884,761—Gelardi et al discloses a CD package comprising a plastic tray having a recess and a rosette positioned centrally therein for gripping and holding a CD. Depending from opposite lateral walls are shelves which extend underneath, parallel to and spaced vertically from the base of the plastic tray. A paper board has two panels and an intermediate spine, the lateral side edges of one of the panels having inwardly extending recesses which engage with the shelves when the lateral edges of the board are received between the shelves and the base of the tray to secure the tray on the paper board in fixed, non-sliding relationship.

However, efforts to date directed at solving both the ecological and economics problems suffer from one or more shortcomings which make the resulting CD packaging either unsatisfactory or not particularly desirable for use. This is because prior art packaging is, typically, either of complex construction and, therefore, uneconomical to manufacture and unreliable in use or does not facilitate ready separation of the plastic from the paper components and, therefore, makes recycling difficult. Accordingly, there remains a need for a simple, inexpensive to manufacture, easy to use and ecologically acceptable CD package.

SUMMARY OF THE INVENTION

It is therefore a primary object of the present invention to provide an ecologically acceptable CD package comprising a plastic CD holder which can easily be manufactured by injection molding and a paper board cover, where the holder and cover may be readily assembled without the use of adhesives and are easily separable to facilitate recycling.

It is also an object of the present invention to provide an improved plastic and paperboard CD package which is simple, inexpensive to manufacture and easy to use.

It is another object of the present invention to provide an improved CD package comprising a plastic CD holder and a paper board having a base panel and outward extending, upwardly foldable wall flaps joined via a crease to opposite lateral sides and one connecting transverse side of the base panel, the flaps including apertures for mating with lugs on the CD holder.

It is still another object of the present invention to provide an improved CD package wherein flaps extending outwardly from a base panel of a paper board are guided into engagement with lugs extending inwardly from the sides of a plastic CD holder by inclined guide means on the CD holder for mechanically assembling the paper board to the CD holder.

The foregoing and other objects are achieved in accordance with the present invention by providing an ecologically acceptable package for a recording medium, such as a CD, comprising a paper board component releasably attached to a plastic, recording medium-holding component, the package including a paper board component defining: (i) at least one flat base panel having a pair of opposed lateral sides and at least one transverse side which is generally perpendicular to the lateral sides; (ii) a flap extending outwardly from each of the lateral sides and one of the transverse sides and separated from the sides by a fold line for pivotal movement of the flap about the fold line between an open orientation wherein the flaps and the base panel are substantially coplanar and a folded orientation wherein each of the flaps is substantially perpendicular to said base panel for defining an upwardly opening, at least three-sided, paper board box; and (iii) at least one aperture in each flap; and a plastic component for receiving and holding a recording medium, defining: (i) a generally planar surface for receiving and maintaining a recording medium thereon; (ii) a pair of opposed lateral sides and a transverse side which is generally perpendicular to the lateral sides, the sides depending from the generally planar surface for defining a downwardly opening, at least three-sided plastic box; (iii) at least one lug extending inwardly from each of the depending sides, the lug projecting under and spaced from the underside of the planar surface; and (iv) wall means depending from the planar surface adjacent each of the depending sides for guiding and directing the leading edge of each of the flaps into a passageway defined between the wall means and the adjacent depending side, the apertures in the flaps engaging the lugs for releasably attaching the paper board component to the plastic component.

In a preferred embodiment, each of the depending sides includes two lugs extending inwardly therefrom, each of the flaps includes two apertures and wall means depend from the planar surface adjacent opposite sides of each lug and, desirably, intermediate the lugs on each depending side. The side of the wall means closest to the adjacent depending wall preferably inclines down from the planar surface and away from the adjacent depending side to enlarge the entry to the passageway and to facilitate insertion of the flaps therein. In a particularly preferred embodiment each lug is generally triangular as viewed in a vertical section taken through the lug and perpendicular to the depending side from which it extends, a side of the triangle inclining from the depending side toward the inclined side of the wall means for directing and guiding the leading edges of the flaps toward the inclined side and into the passageway.

In another aspect of the invention, there is provided a method of assembling a storage package for a recording medium comprising the steps of forming an upwardly opening, at least three-sided paper board box by pivoting the flaps about a fold line until they are substantially perpendicular to the generally rectangular base panel, inserting the free ends of the flaps within the downwardly facing opening defined by a plastic box comprising a planar, generally rectangular surface and depending opposed lateral sides and a transverse side, the plastic box being dimensioned to receive the paper board flaps therewithin with the flaps closely adjacent the corresponding lateral and transverse depending sides of the plastic box, and causing the free ends of the flaps to move upwardly into the passageways defined between the depending adjacent sides of the plastic box and wall means depending from the planar surface, the wall means guiding and directing the free ends of the flaps until the flaps engage the lugs which extend inwardly from the adjacent depending sides.

BRIEF DESCRIPTION OF THE DRAWINGS

FIG. 1 is a perspective view, viewed from above, of one embodiment of the improved CD package of the present invention.

FIG. 2 is a perspective view, viewed from below, of the improved CD package of FIG. 1.

DESCRIPTION OF THE PREFERRED EMBODIMENT

Figure 3:
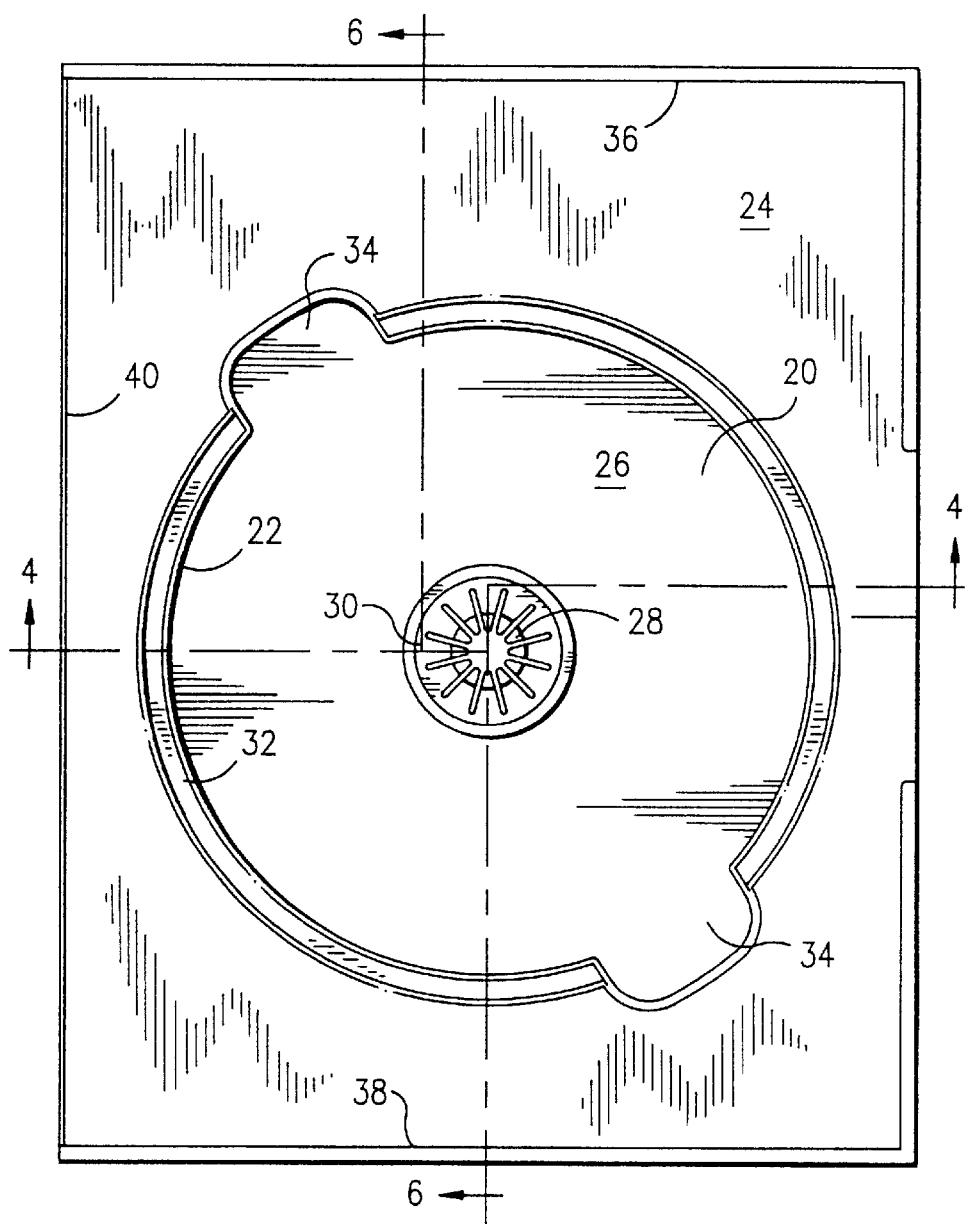
FIG. 3 is a top plan view of the plastic CD holder component of the improved CD package of FIG. 1.
Figure 4:
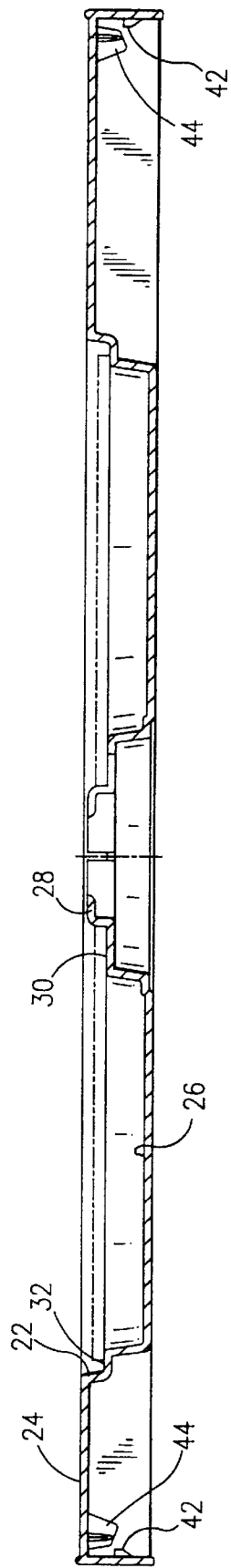
FIG. 4 is a right side sectional view taken along line 4—4 of FIG. 3.
Figure 6:
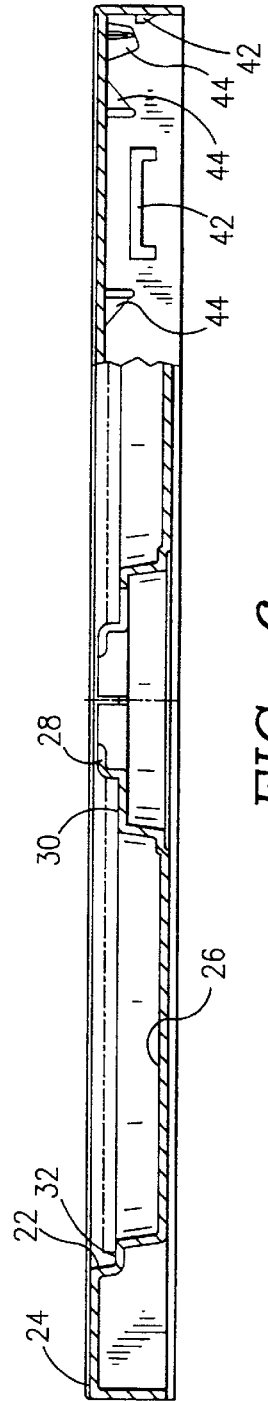
FIG. 6 is a front sectional view taken along line 6—6 of FIG. 3.
Figure 5:
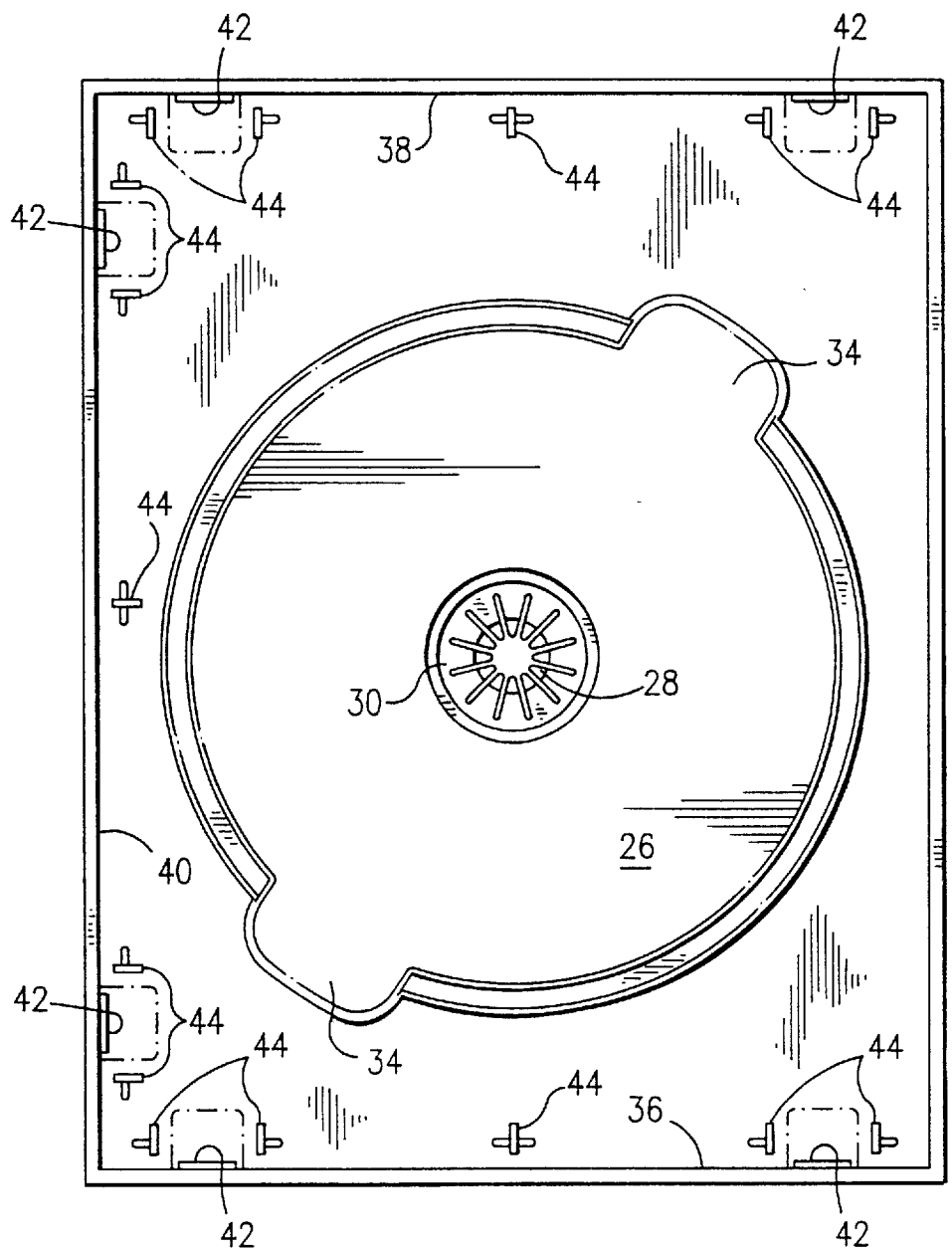
FIG. 5 is a bottom plan view of the CD holder component of the improved CD package of FIG. 1.

A preferred embodiment of the present invention is illustrated in FIGS. 1, 2, 3, 4, 6 and 10 in which there is illustrated an improved CD package 10. The package includes an injection molded plastic tray 12 and a paper board 14 which is mechanically attached to the tray 12 in accordance with the present invention in such a manner that the plastic and paper components are easily separable and recyclable. Unlike the all-plastic jewel box conventionally used for the storage of CDs, the packaging of the present invention is largely formed of paper which readily decomposes and is, therefore, more ecologically acceptable than plastic.

Tray 12 is a rectangular, relatively thin plate-like member which is formed with a circular recess 20 defined by a circular side wall 22 extending downwardly from surrounding planar surface 24 to base 26. A rosette 28 for gripping a CD and holding it within recess 20 is molded on raised CD seat 30 which, itself, is molded on base 26. Raised seat 30 provides a circular surface on which the annular area of the CD which is immediately adjacent the central disc aperture can be supported above the base 26. This area of the CD typically contains no recorded information and, therefore, contact between the CD in this area and the raised seat will not damage the CD. The CD may also be peripherally supported at its outer edges by peripheral shelf 32 formed in circular side wall 22. The outer edges of a CD also, typically, contain no recorded information in order to provide further assurance that contact of the recorded areas of the CD with the base will be avoided. Extending upward from disc seat 30 is rosette 28 which is, typically, a vertical cylindrical section including radially outwardly biased gripping fingers for engaging the central opening of a CD placed thereon. Planar surface 24 of tray 12 includes at least one pair of diametrically opposed finger wells 34 which communicate with the base 26 of recess 20 to facilitate a user removing a recording medium from the recess 20. Recess 22, rosette 28 and finger wells 34 are all well known in the CD packaging art and need not be described in detail herein.

Referring to FIGS. 5, 7, 8 and 11, two opposite lateral sides 36, 38 and one connecting transverse side 40 of tray 12 have at least one integrally molded lug 42 extending inwardly from each of the sides underneath the tray and spaced from the underside of base 26 for engaging apertures 78 in sidewall flaps 66, 68, 70 upstanding from the paper board component 14. Adjacent each lug 42 and depending from the underside of base 26 is at least one inclined wall projection 44 for guiding and directing the sidewall flaps into engagement with the lugs. As will be explained more fully hereinafter, the inclined wall projections 44 are positioned close to the depending sides 36, 38, 40 to define therebetween a narrow passageway 46 into which the sidewall flaps are inserted and guided as the flaps slide upwardly into the space between the depending tray sides 36, 38, 40 and the inclined wall projections 44. The flaps 66, 68, 70 fit sufficiently snugly in passageway 46 that there is essentially no movement of the sidewall flaps in a direction perpendicular to the adjacent side of the tray. Desirably each lug 42 is elongate and has an inclined wall projection 44 adjacent each end thereof. Preferably each of the two lateral sides 36, 38 and the connecting transverse side 40 have lugs 42 adjacent both ends for secure mechanical engagement of tray 12 and paper board 14. Most preferably, at least one additional inclined wall projection 44 depends from the underside of base 26 adjacent each of the lateral and transverse sides 36, 38, 40 at a point intermediate the lugs 42 for helping to maintain the sidewall flaps adjacent the sides and to guide and direct the sidewall flaps into engagement with the lugs 42.

Figure 9:
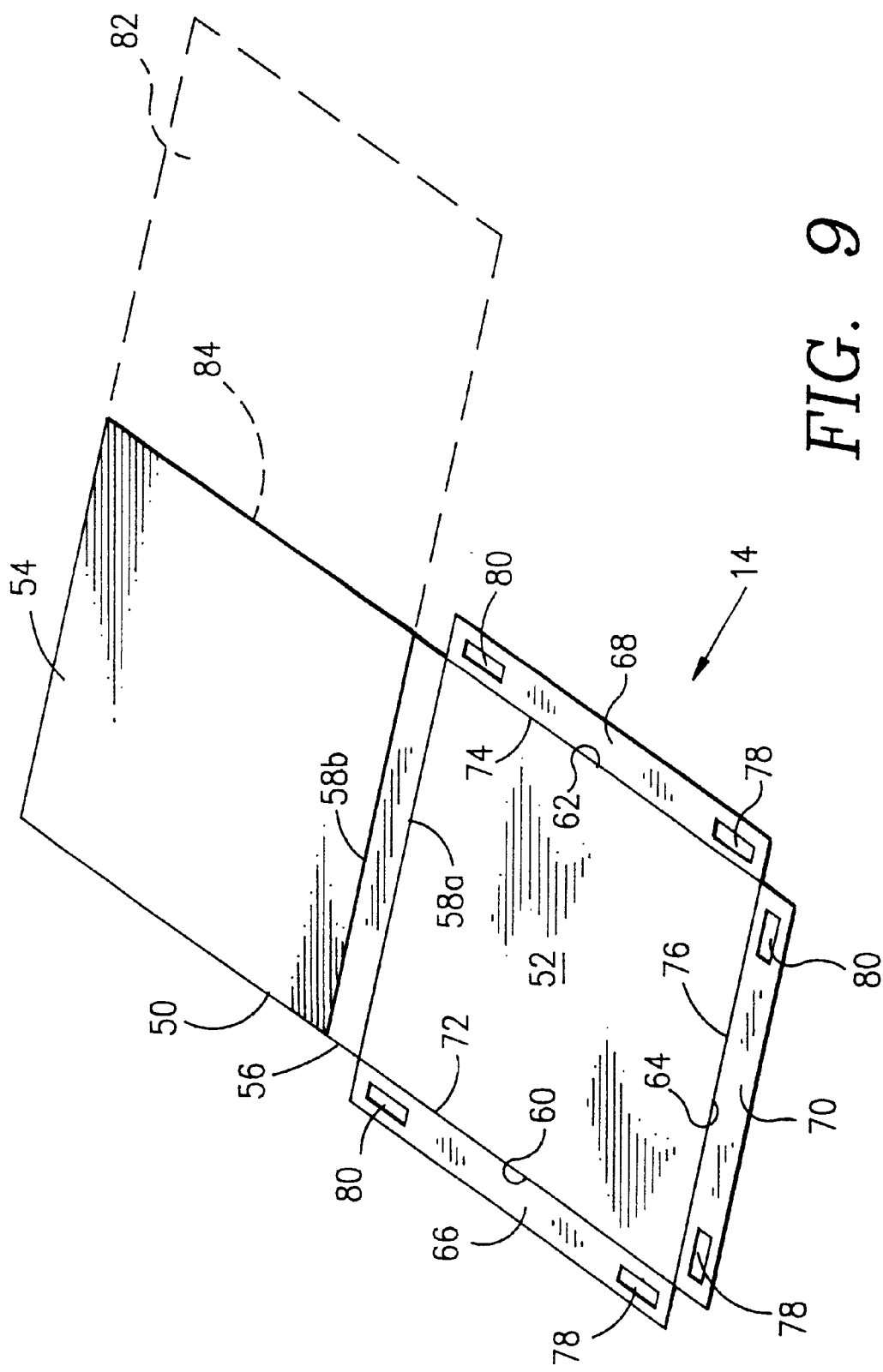
FIG. 9 is a top plan view of a blank for the paper board component of the present invention.

Referring now to FIG. 9, the paper board 14 comprises a plurality of paper panels which are desirably formed from a prescored, pre-printed unitary blank 50. In one embodiment of the invention, blank 50 defines two panels, a base panel 52 and a cover panel 54 separated by a spline panel 56 defined by fold lines or creases 58a, 58b. Opposite lateral sides 60, 62 and connecting transverse side 64 of base panel 52 have outward extending wall flaps 66, 68, 70, respectively, joined to the sides by fold lines or creases 72, 74, 76, respectively. Each of the wall flaps 66, 68, 70 includes a pair of apertures 78, 80, preferably elongate apertures just large enough to slide over and engage lugs 42, adjacent the opposite ends of each flap. The number of apertures in the flaps generally corresponds to the number of lugs projecting from the depending sides of the plastic CD holder. In this embodiment the base panel and cover panel are single ply although, in some instances, it may be desirable for one or both of these panels to be two or multiple ply. For example, as shown in phantom in FIG. 9 cover panel 54 may be formed as a two ply panel by providing an additional rectangular section 82 of substantially the same size as panel 54 and joined along one side thereof by fold line or crease 84. Section 82 may be folded over crease 84 and glued to adjacent section 54 to form a two ply cover panel which may be desirable for aesthetic reasons or to enhance the rigidity of the cover for protecting the CD within the package. Typically, there is no reason to make the base panel two ply since the CD tray 12 will be mechanically affixed thereto to provide the needed rigidity. Moreover, while a two panel embodiment of a CD package is illustrated and described, it will be appreciated that similar packages utilizing the principles of the present invention may be formed from a greater number of panels by the inclusion of optional panels (not shown) intermediate the base and cover panels. Blank 50 is typically printed with graphics on both sides of cover panel 54 and on the outside of the base panel. If desired, the inside and/or outside of the spline panel may also be printed with graphics. If tray 12 is transparent, then it may be desirable to print the inside of the base panel as well.

Figure 7:
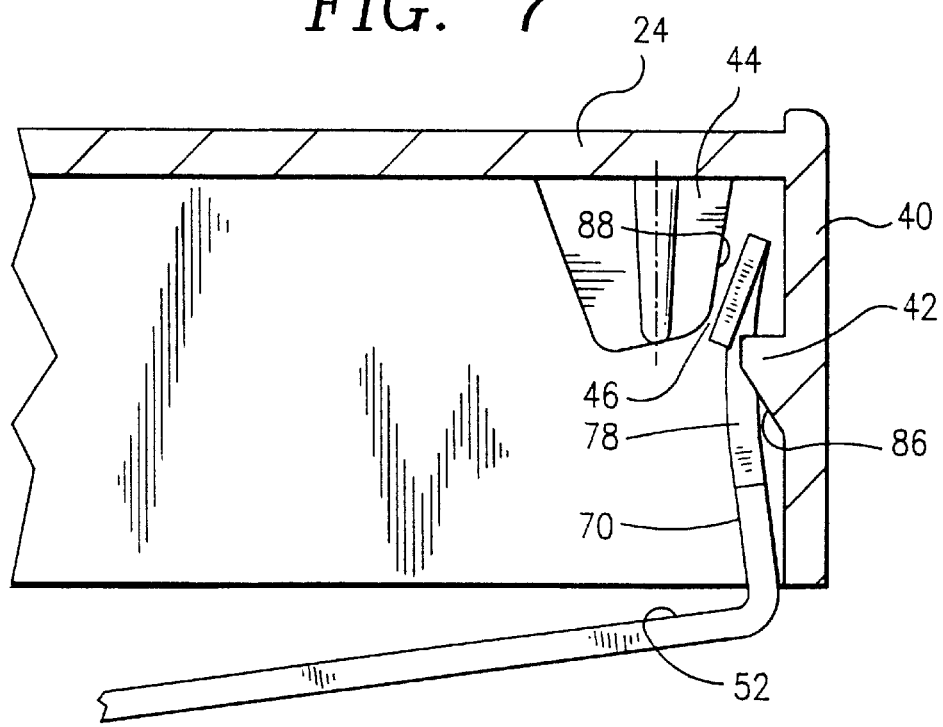
FIG. 7 is a partial sectional view showing the juxtaposition of the paper board relative to the CD holder following insertion of the paper board flaps into the passageway but before the paper board is mated to the holder.
Figure 8:
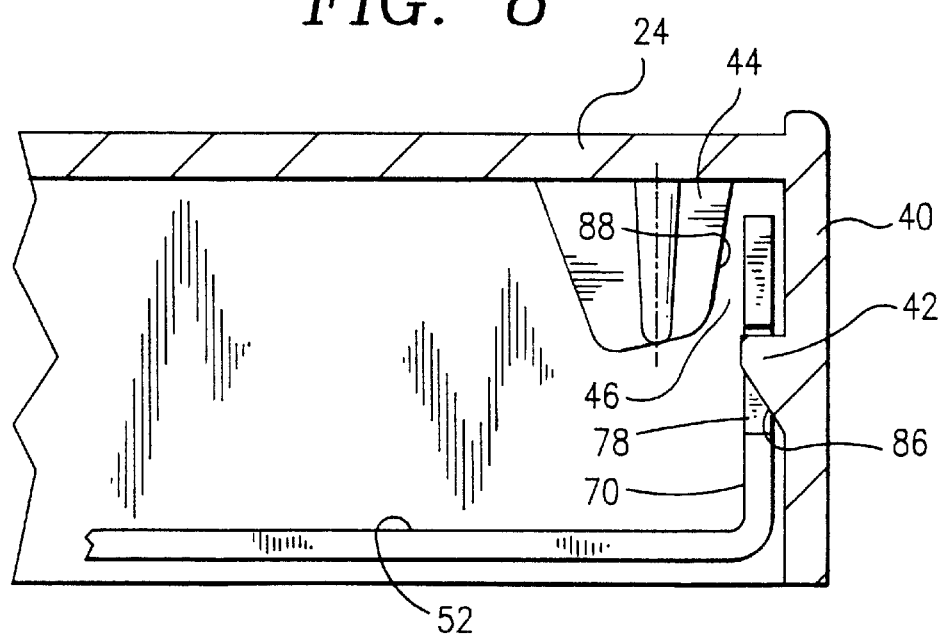
FIG. 8 is a partial sectional view showing the engagement between the paper board and the CD holder after the paper board has been mated to the CD holder.
Figure 10:
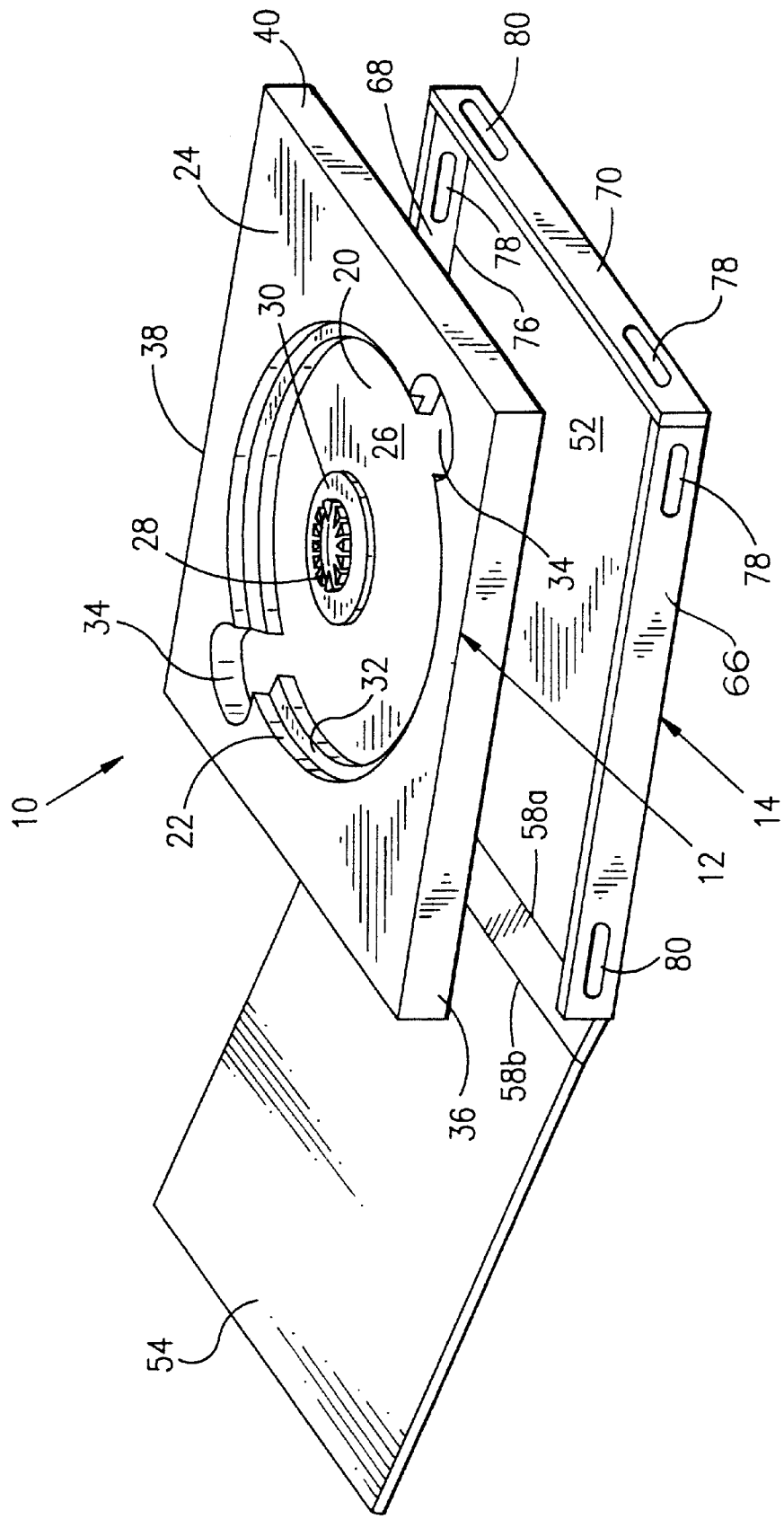
FIG. 10 is an intermediate assembly perspective view of the paperboard cover and the CD holder prior to assembly of these components into the improved CD package of the present invention.
Figure 11:
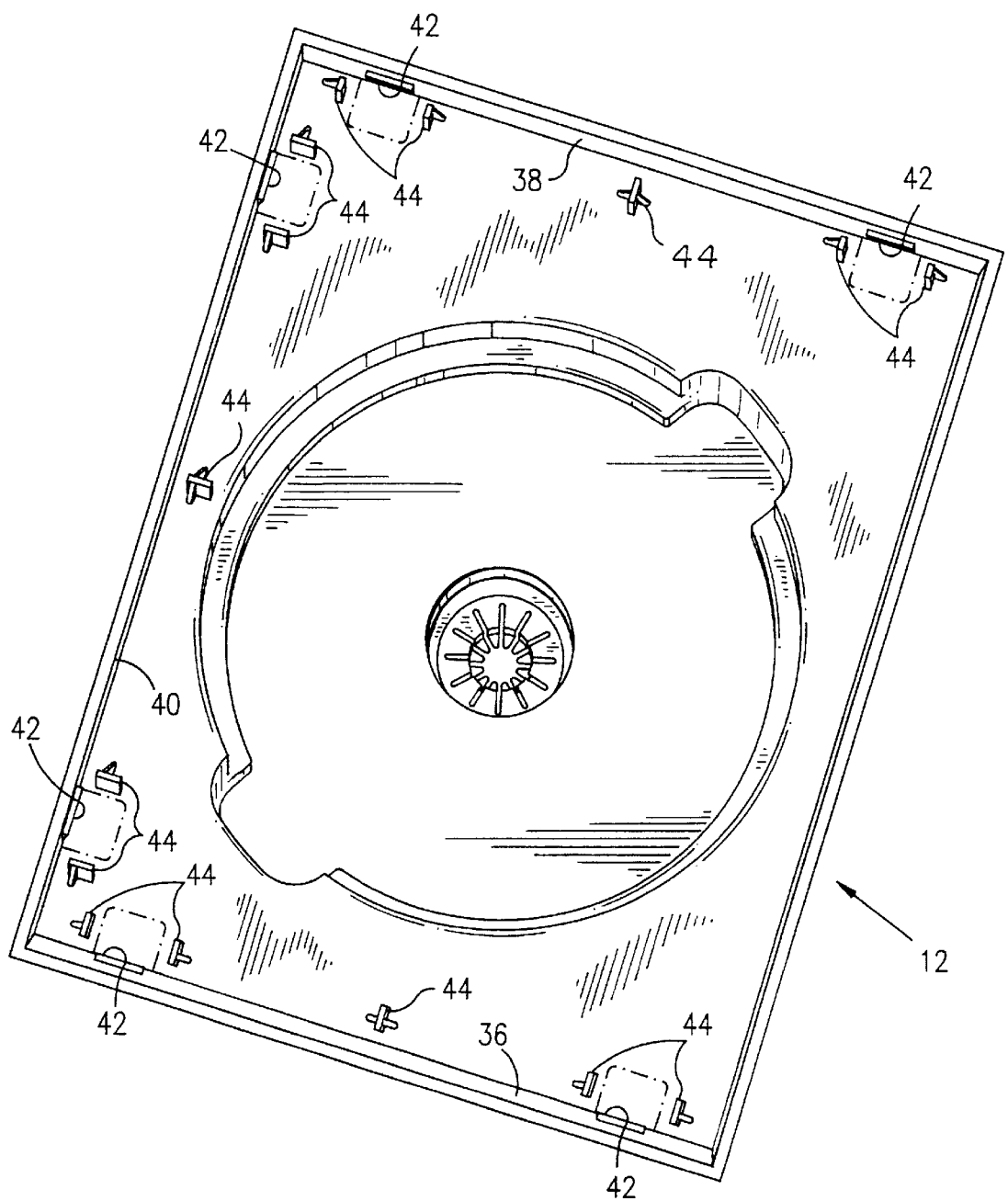
FIG. 11 is a perspective view, viewed from below, of the CD holder component of the improved CD package of FIG. 1.

With reference to FIGS. 7, 8 and 10, to assemble the paper board 14 and tray 12 the wall flaps 66, 68, 70 are folded along respective creases 72, 74, 76 until the flaps extend upwardly and perpendicular to base panel 52 to form a three-sided, upward opening box with the base panel 52 as the floor of the box and the flaps 66, 68, 70 as the walls, as shown in FIG. 10. The box is juxtaposed with the open tray bottom in such a manner that the top edges of the wall flaps 66, 68, 70 are respectively adjacent the bottom edges of lateral sides 36, 38 and transverse side 40 of tray 12, also as shown in FIG. 10. As can best be seen in FIGS. 7 and 8, which illustrate the insertion of flap 70 into passageway 46 adjacent transverse side wall 40, each of the upstanding flaps 66, 68, 70 is inserted into the passageway 46 defined between the depending tray side 36, 38, 40 and the inclined wall projection 44. As each flap is pushed upwardly toward the underside of planar surface 24, the leading edge of the flap initially strikes the underside 86 of the lug 42, which is inclined upwardly and away from the depending side from which lug 42 projects. As a result, the flap bends and resiliently deflects along the incline of lug underside 86 and is guided upwardly and toward the inclined side 88 of inclined wall projection 44, which is inclined upwardly and toward the tray side from which lug 42 projects. In this manner, the entry to passageway 46 is wider than the remainder of passageway 46 to facilitate the insertion of the flap leading edge therein. When the leading edge of the flap strikes inclined side 88, as it continues to be pushed upwardly, it bends in the opposite direction and deflects along the incline of inclined side 88 back toward depending side 40 as it is directed further into passageway 46. As the leading edge of the flap continues to be pushed upwardly toward the underside of planar surface 24, aperture 78 comes into registry with lug 42, at which point the resilience of the flap permits it to unbend and return to its original shape, causing the aperture to override and frictionally engage or otherwise lock onto lug 42. This very same engagement occurs with aperture 80 at the opposite end of each flap with the result that each flap 66, 68, 70 engages, via apertures 78, 80, the inwardly projecting lugs 42 on each of depending tray sides 36, 38, 40 to assemble paper board 14 to CD tray 12.

It will be appreciated that any number of trays can be mechanically assembled in a package in accordance with the present invention to a corresponding number of paper board panels. Thus, the number of trays may be one less than the number of panels with the bare panel serving as a cover panel and disposed at one end, in which case, provided the spine panels between the base panels and between the base panels and the cover panel are made wide enough to accommodate the number of trays, the trays may be folded on top of each other and the cover panel folded over the top tray. Alternatively, the cover panel can be omitted and a base panel with tray thereon folded over the top tray, in which case the base panel which is folded over the top tray serves as the cover.

While the present invention has been described in terms of specific embodiments thereof, it will be understood that no limitations are intended to the details of construction or design other than as defined in the appended claims.

What is claimed is:

1. A storage package for a recording medium comprising a paper board component releasably attached to a plastic, recording medium-holding component, said package including:
   A. a paper board component defining:
      (i) at least one flat base panel having a pair of opposed lateral sides and at least one transverse side which is generally perpendicular to said lateral sides;
      (ii) a flap extending outwardly from each of said lateral sides and said at least one transverse sides and separated from said sides by a fold line for pivotal movement of said flap about said fold line between an open orientation wherein said flaps and said base panel are substantially coplanar and a folded orientation wherein each of said flaps is substantially perpendicular to said base panel for defining an upwardly opening, at least three-sided, paper board box;
      (iii) at least one aperture in each said flap;
   B. a plastic component for receiving and holding a recording medium, defining:
      (i) a generally planar surface for receiving and maintaining a recording medium thereon;
      (ii) a pair of opposed lateral sides and a transverse side which is generally perpendicular to said lateral sides, said sides depending from said generally planar surface for defining a downwardly opening, at least three-sided plastic box, said plastic box being dimensioned to receive said paper board box therewithin with said flaps closely adjacent the corresponding depending sides of said plastic box;
      (iii) at least one lug extending inwardly from each of said depending sides, said at least one lug projecting under and spaced from the underside of said planar surface; and
      (iv) wall means depending from said planar surface adjacent each of said depending sides for guiding and directing the leading edge of each of said flaps into a passageway defined between said wall means and said depending adjacent side, said apertures in said flaps engaging said lugs for releasably attaching said paper board component to said plastic component.

2. A storage package, as claimed in claim 1, wherein said wall means depends from said planar surface adjacent each of said lugs.

3. A storage package, as claimed in claim 2, wherein each said depending side includes two lugs extending inwardly therefrom.

4. A storage package, as claimed in claim 3, wherein said wall means depends from said planar surface adjacent opposite sides of each lug.

5. A storage package, as claimed in claim 4, wherein additional wall means depends from said planar surface adjacent each said depending side intermediate said lugs.

6. A storage package, as claimed in claim 1, wherein a side of each said wall means which is closest to the adjacent depending side inclines down from said planar surface and away from said adjacent depending side, whereby the entry to said passageway is wider than the remainder of said passageway for easy insertion of said flaps therein.

7. A storage package, as claimed in claim 6, further including inclined means extending inwardly from each of said depending sides, said inclined means having a side which inclines from said adjacent depending side toward the inclined side of said wall means for directing and guiding a leading edge of each said flap toward said inclined side of said wall means and into said passageway.

8. A storage package, as claimed in claim 7, wherein each said lug is generally triangular in a vertical section taken through said lug and perpendicular to the depending side from which it extends and a side of said triangle comprises said side of said inclined means.

9. A storage package, as claimed in claim 8, wherein each said depending side includes two lugs spaced along a length of said side, said wall means depend from said planar surface adjacent opposite sides of each lug and each said flap includes two apertures therein for engaging said two lugs projecting from said depending sides.

10. A storage package, as claimed in claim 1, wherein said generally planar surface has a circular recess formed therein for receiving said recording medium and a rosette within said recess for releasably holding said recording medium in said recess.

11. A storage package, as claimed in claim 10, wherein said generally planar surface further includes at least two opposed finger wells communicating with and extending outwardly from said recess for allowing the insertion of fingers therein when removing said recording medium from said recess.

12. A storage package, as claimed in claim 1, wherein said paper board component further comprises a flat cover panel having dimensions substantially corresponding to the dimensions of said base panel and a transversely extending spine panel interconnecting the base and cover panels, said spine panel being defined by a first transverse crease at a joinder of said base and spine panels and a parallel second transverse crease at a joinder of said spine and cover panels, said cover being pivotable about said creases between a package open orientation wherein said spine and cover panels are substantially coplanar with said base panel for exposing said recess to enable access thereto and a closed orientation wherein said spine extends perpendicularly to said generally planar plastic surface along one transverse side thereof and said cover panel overlies said generally planar plastic surface to block access to said recess and to protect a recording medium therewithin.

13. A storage package for a recording medium comprising a paper board component releasably attached to a plastic, recording medium-holding component, said storage package comprising:

a paper board component comprising at least one flat base panel and upstanding flap means extending substantially perpendicular to and upwardly from said base panel along at least a portion of said base panel, said flap means having at least one aperture therein; and a plastic, recording medium-holding component comprising:
   (i) a generally planar surface for receiving and maintaining a recording medium thereon;
   (ii) skirt means depending from said planar surface, said skirt means being dimensioned and positioned along said planar surface such that said upstanding flap means is positioned closely adjacent said depending skirt means when said paper board component is attached to said plastic component;
   (iii) at least one lug extending inwardly from one side of said skirt means toward said flap means, said at least one lug projecting under and spaced from an underside of said planar surface; and
   (iv) wall means depending from said planar surface adjacent said skirt means on the side thereof supporting said lug for guiding and directing a leading edge of said flap means into a passageway defined between said wall means and said depending adjacent skirt means, said apertures in said flaps engaging said lugs for releasably attaching said paperboard component to said plastic component.

14. A method of assembling a storage package for a recording medium comprising:

(a) forming a generally rectangular paper board base panel having coplanar flaps extending outwardly from two opposed lateral sides and one transverse side of said base panel into an upwardly opening, at least three-sided, paper board box by pivoting said flaps about their intersection with said panel sides until said flaps are substantially perpendicular to said base panel;

(b) inserting the free ends of said flaps within a downwardly facing opening defined by a plastic box comprising a generally planar, rectangular surface having two lateral sides and a transverse side depending from said planar surface, said plastic box being dimensioned to receive said paper board flaps therewithin with said flaps closely adjacent the corresponding lateral and transverse depending sides thereof, and (c) causing said free ends of said flaps to move upwardly within said downwardly facing opening into passageways defined between the depending adjacent sides of said plastic box and wall means depending from said planar surface, said wall means guiding and directing the free ends of said flaps until said flaps engage with lugs extending inwardly from said adjacent depending sides.

15. A method, as claimed in claim 14, wherein the step of inserting said free ends of said flaps comprises guiding said free ends into said passageway by causing said free ends to contact, as they move upwardly into said downwardly facing opening, an inclined wall projecting inwardly from said adjacent depending sides for deflecting said free ends toward said wall means.

16. A method, as claimed in claim 15, wherein the step of causing said free ends of said flaps to move upwardly further includes guiding said free ends through said passageway by causing said free ends to contact an inclined side of said wall means for deflecting said free ends toward said adjacent depending sides.

* * * * *